(12) United States Patent
Hoermann et al.

(10) Patent No.: US 8,277,592 B2
(45) Date of Patent: Oct. 2, 2012

(54) METHOD OF SHAPING A REFLECTOR

(75) Inventors: Alexander F. Hoermann, Menlo Park, CA (US); David B. DeGraaf, Mountain View, CA (US); James L. Barnhart, Sunnyvale, CA (US); David John McKay, Mountain View, CA (US); Daniel Crenshaw, Los Gatos, CA (US); Scott P. Phillips, Marina Del Rey, CA (US); Forest Ray, Redwood City, CA (US); Seung Lim, Santa Cruz, CA (US)

(73) Assignee: AREVA Solar, Inc., Mountain View, CA (US)

( * ) Notice: Subject to any disclaimer, the term of this patent is extended or adjusted under 35 U.S.C. 154(b) by 604 days.

(21) Appl. No.: 12/413,367

(22) Filed: Mar. 27, 2009

(65) Prior Publication Data

US 2010/0243136 A1  Sep. 30, 2010

(51) Int. Cl.
*B29C 65/50* (2006.01)
(52) U.S. Cl. .......... 156/196; 156/99; 156/102; 156/160; 156/212
(58) Field of Classification Search .................. 156/99, 156/102, 160, 196, 212, 475, 486; 65/106; 100/155 G
See application file for complete search history.

(56) References Cited

U.S. PATENT DOCUMENTS

| | | | |
|---|---|---|---|
| 3,248,918 A | 5/1966 | Brown | |
| 4,239,344 A | 12/1980 | Wildenrotter | |
| 4,268,332 A | 5/1981 | Winders | |
| 4,696,713 A * | 9/1987 | Okafuji et al. | 156/358 |
| 4,731,144 A | 3/1988 | Kommineni et al. | |
| 5,011,563 A * | 4/1991 | Shinno et al. | 156/574 |
| 5,086,635 A | 2/1992 | Creaser et al. | |
| 5,136,935 A * | 8/1992 | Didelot et al. | 156/582 |
| 5,300,184 A * | 4/1994 | Masunaga | 156/582 |
| 7,287,401 B2 * | 10/2007 | Schnabel, Jr. | 65/104 |
| 2009/0260753 A1 | 10/2009 | Selig et al. | |

FOREIGN PATENT DOCUMENTS

| | | |
|---|---|---|
| JP | 56-064251 | 6/1981 |
| WO | 2007031062 A1 | 3/2007 |
| WO | 2008092194 A1 | 8/2008 |
| WO | 2008092195 A1 | 8/2008 |

OTHER PUBLICATIONS

Patent Abstracts of Japan, JP56-064251, 1 page.
International Search Report and Written Opinion, 14 pages.

* cited by examiner

*Primary Examiner* — Khanh P Nguyen
*Assistant Examiner* — John Blades
(74) *Attorney, Agent, or Firm* — Patent Law Group LLP; Rachel V. Leiterman (57) ABSTRACT

A mirror is shaped using a shaping apparatus including a crossbar and a horizontal array of members (wheels in some embodiments) attached to a bottom of the crossbar. The height of the array of members is adjusted to form a predetermined shape. The shaping apparatus is positioned over a mirror such that the members contact the mirror. The shaping apparatus is moved along a length of the mirror such that the members remain in contact with the mirror. A frame is attached to the mirror such that when the shaping apparatus is removed from the mirror, the mirror substantially retains the predetermined shape.

16 Claims, 7 Drawing Sheets

METHOD OF SHAPING A REFLECTOR

BACKGROUND

Solar power may be used to produce electricity by using mirrors to concentrate solar radiation on one or more receivers. In some examples, the sunlight heats a fluid in a receiver, producing a heated, pressurized fluid (e.g. gas or a gas/liquid mixture) either directly by boiling the fluid, or indirectly by running the heated fluid through one or more heat exchangers to produce a heated pressurized fluid, such as steam. In some variations, steam can be used directly in applications that require process steam. In some variations, heated pressurized gas (e.g. steam) turns one or more turbines which power electrical generators. In other examples, the receiver includes one or more photovoltaic devices that absorb concentrated sunlight and directly generate electricity.

The mirrors used in such arrangements are often curved. Curved mirrors are conventionally formed by bending a mirror over a shaped form or mold, then adhering or otherwise attaching a support frame to the mirror, such that the mirror retains the shape of the form or mold after being attached to the frame. Forming mirrors by this technique is described in, for example, U.S. Pat. Nos. 4,268,332 and 4,239,344. Typical fabrication tolerances of mirrors formed by this technique are such that substantial optical errors can be introduced. In some cases, refining the fabrication tolerances to reduce errors may be prohibitively costly.

SUMMARY

In accordance with embodiments of the invention, a reflector is shaped using a shaping apparatus including a crossbar and an array of shaping members (wheels in some embodiments) attached to a bottom of the crossbar. The height of the members in the array is adjusted to form or trace out an arc corresponding to a predetermined shape. The shaping apparatus is positioned over a mirror that is, in turn, overlaid over a mirror support such that at least some of the shaping members contact the mirror. In some variations, all of the shaping members contact the mirror. Force is applied against the mirror by the shaping members, and the shaping members are moved along a surface of the mirror while applying force such that the predetermined shape is imparted to the mirror. The mirror support is attached to the mirror such that when the shaping apparatus is removed from the mirror, the mirror retains the predetermined shape. The shaping members used to apply force against the mirror may be any suitable members, e.g. rollers, wheels, slidable pads, slidable feet, and the like. In some variations, moving the shaping members along the surface of the mirror comprises translating (e.g. by rolling) the shaping members along a length of the mirror in a direction substantially perpendicular to the arc formed by the shaping members.

Moving the shaping apparatus along the surface of the mirror while applying force to impart the predetermined shape to the mirror may involve compressing a space containing a flowable, hardenable adhesive between the mirror support and the mirror such that adhesive is redistributed within the space (and may be squeezed out of the space), and attaching the mirror support to the mirror to retain the shape may comprise hardening or curing the adhesive.

In some variations, the mirror support has a contour that is designed to roughly approximate the desired predetermined shape and the shaping apparatus provides fine tuning of the shape of the mirror as it is attached to the mirror support (e.g. by spatially redistributing a flowable adhesive between a mirror and the mirror support and then curing the adhesive) so that the resulting reflector exhibits the desired predetermined shape.

In some variations, a shaping apparatus may comprise two parallel crossbars. That is, a top crossbar may be placed in parallel with and over a bottom crossbar to which the shaping members are attached. At least one connector may connect the top crossbar to the bottom crossbar. A distance between the top crossbar and the bottom crossbar may be changed by adjusting a length of the connector. The arc traced out by the shaping members may be due to curvature in the bottom crossbar induced by a distribution of different length connectors, a distribution in heights of the shaping members relative to the bottom crossbar, or a combination thereof.

In some variations of the methods, the crossbar may be coupled to vertical members disposed on each end of the crossbar. Before moving the shaping apparatus along the surface of the mirror, one or more weights may be coupled to the vertical members to increase force applied by the members.

In some variations of the methods, the crossbar may be coupled to side-guiding members disposed on each end of the crossbar and positioned perpendicular to the crossbar. The side-guiding members may be aligned with the mirror support to maintain the crossbar substantially perpendicular to an axis along which the shaping members are moved.

In some variations of the methods, the crossbar is attached to a stabilizing member that controls motion of the shaping members during movement along the surface of the mirror. The stabilizing member may, for example, comprise an outrigger bar disposed in a middle section of the crossbar and positioned substantially perpendicular to the crossbar. The outrigger bar may comprise an outrigger wheel, roller, slidable foot, or slidable pad or the like that is positioned proximate an end of the outrigger bar. Positioning the shaping apparatus may comprise positioning the crossbar such that the outrigger wheel or foot does not contact the mirror.

Some methods for shaping a reflector comprise placing a mirror on a mirror support, where a flowable and curable adhesive is disposed in a space between the mirror and the mirror support. A shaping apparatus comprising one or more shaping members may be used to apply force against a surface of the mirror to compress the space between the mirror and the mirror support. The one or more shaping members form or trace out an arc of a desired contour. The methods comprise moving the one or more shaping members along the surface of the mirror while applying force so as to redistribute the adhesive in the space so that the desired contour is applied to the mirror, and then curing the adhesive so that the mirror is adhered to the mirror support so as to maintain the desired curvature.

In some variations of the methods, the one or more shaping members may be translated (e.g. by rolling or sliding) along a length of the mirror (e.g. in a direction that is substantially perpendicular to the arc formed by the one or more shaping members).

Some variations of the methods may comprise rotating the one or more shaping members along the mirror surface while the one or more shaping members apply force against the surface of the mirror.

In some variations, the one or more shaping members may comprise a roller configured to be rolled across the surface of the mirror. In some variations, the one or more shaping members may comprise a foot configured to be slid across the surface of the mirror. In some variations, a shaping member may comprise a continuous curved slidable surface in the shape of the arc. In some variations, a shaping member may comprise a single curved axle about which one or more rollers rotates.

An apparatus for shaping a reflector is described herein. The apparatus comprises a transverse crossbar supported by a frame and configured to extend across a dimension of a mirror overlaid on a mirror support, and a shaping portion attached to the transverse crossbar. The shaping portion forms an arc corresponding to the desired curvature. The frame and transverse crossbar of the apparatus are positioned in use so that the arc-shaped shaping portion applies force while moving along a surface of the mirror to force the mirror against the mirror support so that the desired curvature is imparted to the mirror.

In some variations of the apparatus, the shaping portion may comprise multiple shaping members attached to the transverse crossbar in a linear configuration with varying heights to form the arc. In some variations of the apparatus, the shaping portion may comprise a single shaping member attached to the transverse crossbar. A shaping member may be any suitable member that can be moved along the surface of the mirror while applying force and without imparting unacceptable damage to the mirror surface. For example, a shaping member may comprise a roller, a wheel, a slidable foot, a slidable pad, or any combination of two or more of the preceding. In some variations, the shaping portion may be integral with the transverse crossbar, or the shaping portion and the transverse crossbar may be a unitary item.

In some variations, a shaping apparatus may be configured to compress a space containing a flowable adhesive between the mirror support and the mirror while forcing the mirror against the support so that the adhesive is redistributed in the space.

Any of the methods and apparatus described herein may be adapted for shaping a convex, concave or planar reflector.

Any of the methods and apparatus described herein may be adapted for shaping a reflector for use in a solar collector array, e.g. a reflector for use in a solar array using a field of heliostats directing sunlight toward a tower receiver, a reflector for use in a linear Fresnel reflector solar array, or a parabolic reflector for a parabolic trough solar array.

DETAILED DESCRIPTION

The following detailed description should be read with reference to the drawings, in which identical reference numbers refer to like elements through the different figures. The drawings, which are not necessarily to scale, depict selective embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives, and uses of the invention, including what is presently believed to be the best mode of carrying out the invention. It should also be noted that, as used in this specification and the appended claims, the singular forms "a," "an," and "the" include plural referents unless the context clearly indicates otherwise. Reference to "about" a value or parameter herein includes (and describes) embodiments that are directed to that value or parameter per se. For example, description referring to "about X" includes description of "X." A description referring to a "range from about X to about Y" includes description of "X" and "Y" and values between X and Y. Unless defined otherwise, all technical and scientific terms used herein have the same meaning as is commonly understood by one of ordinary skill in the art to which this invention belongs. If a definition set forth in this section is contrary to or otherwise inconsistent with a definition set forth in patents, published patent applications, and other publications that are herein incorporated by reference, the definition set forth in this section prevails over the definition that is incorporated herein by reference.

Figure 1:
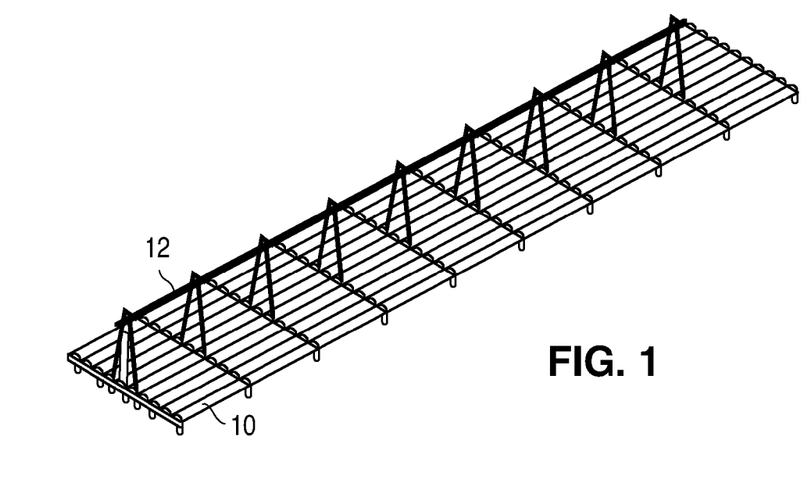
FIG. 1 illustrates an example of an array of linear Fresnel reflectors concentrating solar radiation on an overhead pipe receiver.
Figure 2:
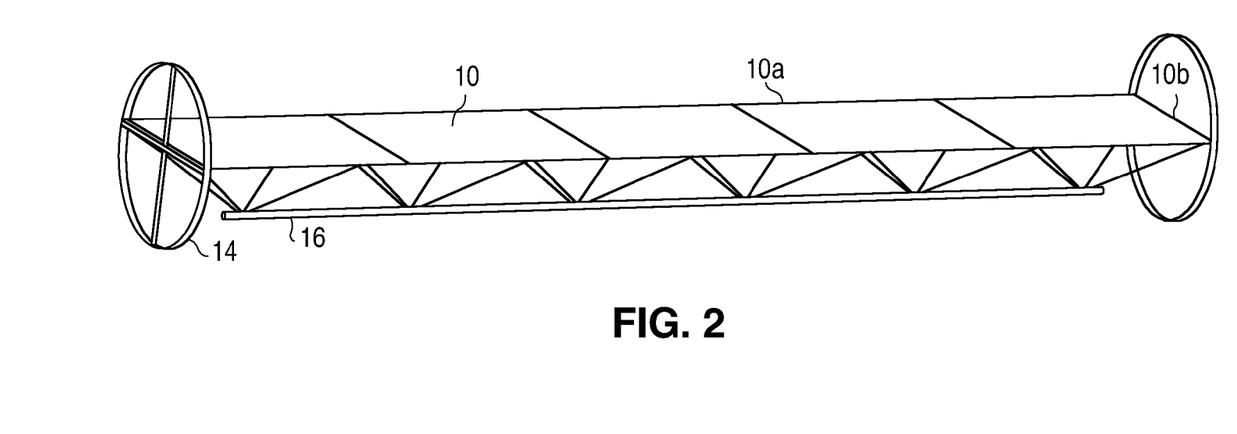
FIG. 2 illustrates an example of a reflector for a linear Fresnel reflector solar array.

The mirrors in a solar array may be configured to focus solar radiation on a line, such as an array of linear Fresnel reflectors (LFR) as illustrated in FIG. 1. Reflectors 10 rotate about a single axis to follow the path of the sun and reflect solar radiation on to one or more elevated receivers 12 disposed over the mirrors. FIG. 2 illustrates an example of a single reflector 10 that can be used in a linear Fresnel reflector array. The long side 10a of reflector 10 may have a length between about 10 and about 20 meters, and the short side 10b may have a length between about 1 and about 4 meters. The reflector may be divided into segments, each segment having a length between about 1 and about 5 meters. Reflectors 10 may be substantially flat (planar), or curved along short axis 10b and substantially straight along long axis 10a. In the illustrated example, hoops 14 on either end of reflector 10 rest on bearings and can tilt the mirror about an axis of rotation that is substantially parallel with or coincident with long axis 10a to follow the path of the sun but other mounting and pivoting methods for reflectors are known. For example, reflector supports may be configured beneath a reflector so as to not extend substantially above the reflective surface, where the supports allow pivotal rotation about an axis substantially parallel with the long axis of the mirror (e.g. reflector supports as described in U.S. Pat. No. 5,899,199 to Mills, which is incorporated by reference herein in its entirety). In certain variations of reflectors, the radius of curvature of the curved short side of a reflector may be between about 10 and about 80 meters, or between about 20 and about 50 meters, or between about 20 and about 40 meters.

Figure 3:
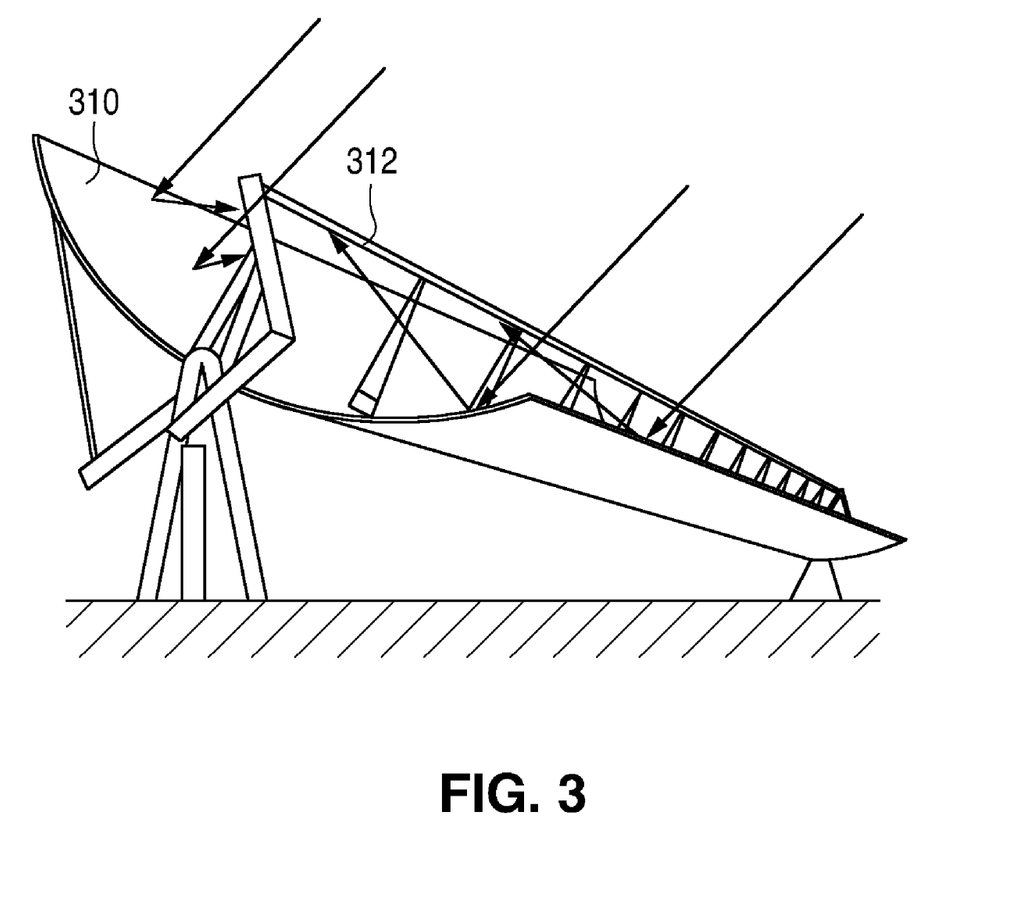
FIG. 3 illustrates an example of a parabolic reflector.

An LFR array, an example of which is illustrated in FIG. 1, is generally arranged such that several reflectors focus solar radiation on a single overhead receiver. An array can comprise multiple receivers, with several reflectors focusing solar radiation to each receiver. In a parabolic reflector, one example of which is illustrated in FIG. 3, a single parabolic reflector (reflector 310 in FIG. 3) focuses solar radiation on a single receiver (e.g. receiver 312 in FIG. 3) positioned at the focal point of the reflector. In a parabolic trough system, the focal point of the reflector can be about 3 meters or less, e.g.

about 3, about 2.5, about 2.2, about 2, about 1.8, about 1.7, about 1.6, about 1.5 meters, or even less such as about 1.2 meters or about 1 meter.

Solar reflectors can be constructed by attaching (e.g. adhering) thin sheet mirrors to mirror supporting structures. Optical properties and quality of focus of the resulting reflector such as focal length, slope error, degree of aberration, etc. can be affected by the underlying supporting structure. Optical properties and quality of focus of a reflector can also be affected by properties of an adhesive disposed between a mirror and a mirror support and used to adhere a mirror to the supporting structure such as adhesive consistency, thickness, uniformity of thickness, etc. In some cases, the fabrication process of adhering a mirror to the substrate can introduce undesired optical errors, e.g. due to buckling of the mirror, or formation of ridges, creases, bumps, rolls, bubbles and the like that cause the contour of the mirror to deviate from a desired reflector contour.

A desired reflector contour may in some cases be planar, and in some cases be curved to a desired radius of curvature such as a linear Fresnel reflector, a parabolic trough reflector, a spherical reflector, or a parabolic reflector. The radius of curvature may be relatively large (e.g. between about 10 and about 80, or between about 20 and about 70, or between about 20 and about 40 meters for reflectors used in an LFR system) or may be relatively smaller (e.g. about 3 meters or less for parabolic trough systems, such as about 3, about 0.2.5, about 2.2, about 2, about 1.8, about 1.7, about 1.6, about 1.5, about 1.2, or about 1 meter). A desired reflector contour may be concave or convex.

Some embodiments of the invention are directed to apparatus and methods for forming reflectors curved along a single axis, such as the reflectors in linear Fresnel reflector arrays or parabolic reflector devices described above. Some embodiments are directed to apparatus and methods for forming reflectors curved along two axes, such as spherical or parabolic reflectors. Some embodiments are directed to apparatus and methods for forming planar reflectors.

The shaping apparatus comprises a shaping portion that comprises one or more shaping members that are configured to press down on the surface of the mirror while being moved across the surface of the mirror. The one or more shaping members are in the shape of an arc corresponding to the desired reflector curvature. The arc-shape traced out by the one or more shaping members is then moved (e.g. translated or rotated) across the surface of the mirror while applying force to the mirror so as to impart the desired three dimensional curvature of the reflector. The desired curvature can be retained by a mirror support attached (e.g. adhered) to the shaped mirror. Thus, in accordance with various embodiments of the invention, a shaping apparatus comprises a shaping portion that is adjusted to define the shape of a reflector along the short axis, and then is translated (e.g. by rolling or sliding) along the long axis of a mirror to shape a linear Fresnel reflector for a solar array or a parabolic trough reflector for a solar array. In some variations, the shaping portion may be integral with the transverse crossbar, or the shaping portion and the transverse crossbar may be a unitary item.

A shaping member may comprise any suitable element that can be moved (e.g. translated or rotated) along the surface of a mirror with sufficient force to shape the contour of the mirror yet not impart an unacceptable level of damage the surface of the mirror. In some variations, a shaping member can comprise a wheel, a roller, a slidable foot, a slidable pad, a slidable surface, or the like to make contact with the mirror surface. In some variations, a shaping member may comprise a single curved axle about which one or more rollers rotates.

In some variations, a shaping member may comprise a single curved arcuate structure with a slidable surface configured to slide along the surface of the mirror.

Figures 4, 5:
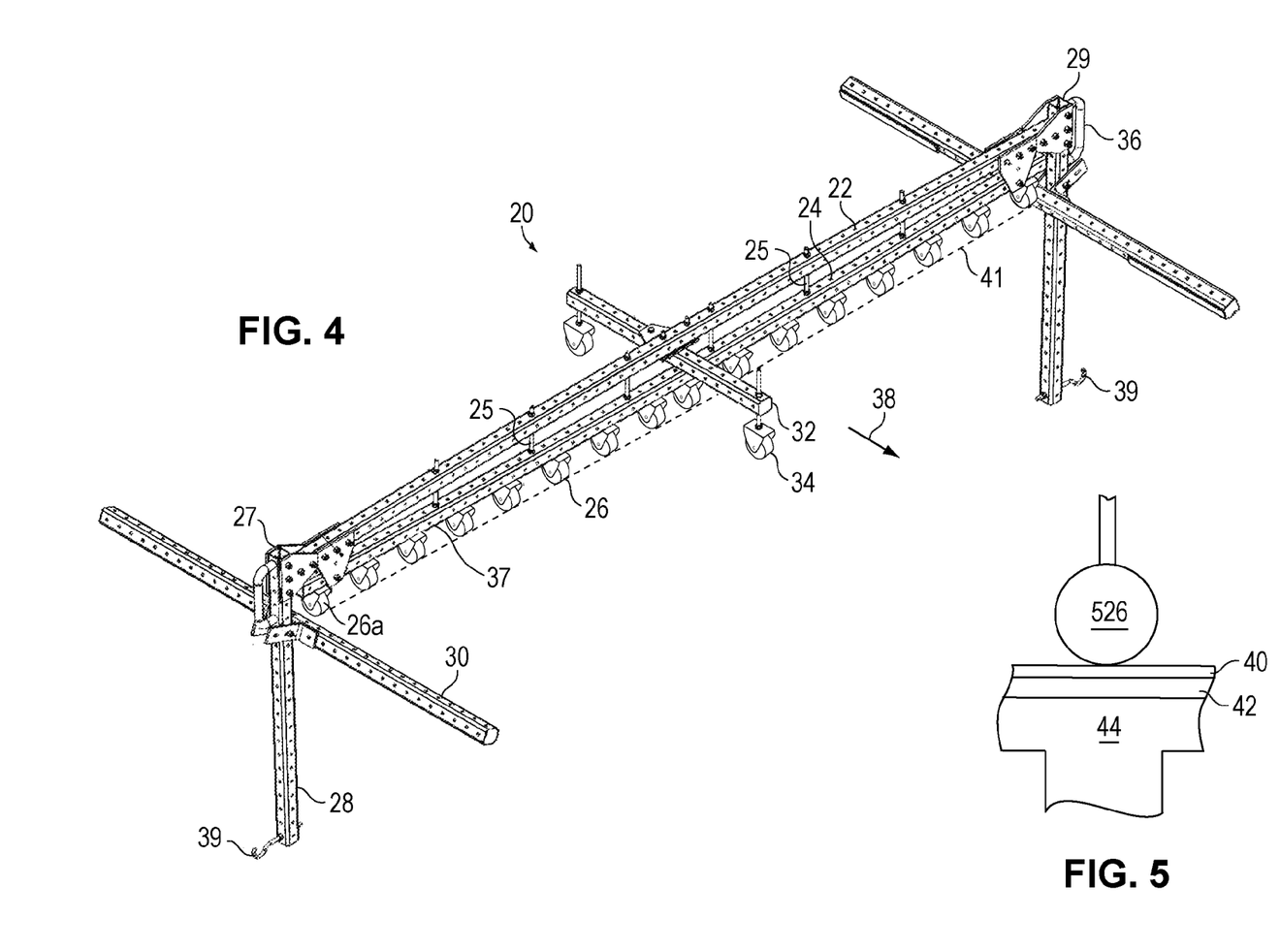
FIG. 4 illustrates a shaping apparatus according to some embodiments of the invention.
FIG. 5 illustrates an example in which a portion of a mirror is attached to a frame by an adhesive.

FIG. 4 illustrates an example of an apparatus for shaping a mirror, according to various embodiments of the invention. In this particular variation, shaping apparatus 20 includes a shaping portion that comprises a transverse (e.g. horizontal) array of shaping members 26 (which in this variation are depicted as wheels) mounted to a frame 27. In this particular variation, the frame 27 includes a top transverse crossbar 22 and a bottom transverse crossbar 24. The top crossbar 22 is attached to vertical members 28, e.g. by brackets 29. The top crossbar 22 is disposed parallel to, but offset from, bottom crossbar 24. In some embodiments, the top crossbar 22 may be attached to vertical members 28 such that the position of top crossbar 22 does not change relative to vertical members 28 in use. Top crossbar 22 may be formed from any suitably rigid material such as wood, plastic, ceramic, or metal such as aluminum or steel.

In the variation illustrated in FIG. 4, bottom crossbar 24 is attached to top crossbar 22 (e.g. by brackets 29) and one or more connectors 25. Bottom crossbar 24 may be attached such that its position is fixed relative to top crossbar 22, or bottom crossbar 24 may be attached to top crossbar 22 in a way that permits the shape of bottom crossbar 24 to be adjusted to define the curvature of a mirror to be shaped with shaping apparatus 20, e.g. so that bottom crossbar 24 attains a curvature that is concave toward top crossbar 22. For example, the shape or curvature of bottom crossbar 24 may be adjusted by adjusting the height of one or more (e.g. multiple) connectors 25 as extending between top crossbar 22 and bottom crossbar 24. Connectors 25 may be any type of connector that allows adjustment of an amount of displacement between the top crossbar 22 and the bottom crossbar 24. For example, in some variations, the connectors 25 may be selected from a set of rod-like or pin-like connectors having pre-set lengths and distributed along the length of the transverse crossbars so as to achieve the desired shape, e.g. a cross-sectional arc of a linear Fresnel reflector or a parabolic trough. In some variations, the connectors 25 may comprise threaded rods or bolts passed through holes in top and bottom crossbars 22 and 24. The holes in top and bottom crossbars 22 and 24, respectively, may be threaded or smooth. One or more nuts may be threaded on each bolt and placed in contact with the bottom side, the top side, or both top and bottom sides of one or both of top and bottom crossbars 22 and 24, respectively. The height of bottom crossbar 24 relative to top crossbar 22 may be adjusted by turning a nut to lengthen or shorten (e.g. raise or lower) the connector 25. Other adjustable length connectors or supports besides bolts may be used, with non-limiting examples including one or more rods or pins clamped or otherwise attached to the top and/or bottom crossbars, one or more rods with cotter pins, one or more pins friction-fit into holes in the top and/or bottom crossbar, one or more ratcheting connectors, one or more telescoping connectors, one or more actuators (e.g. linear actuators). For adjustable length connectors, adjustments may be made manually or automatically (e.g. by an actuator). In some variations, a single shaping apparatus may employ more than one type of connector between the top and bottom crossbars, e.g. at least one connector may comprise a bolt or threaded rod, while another of the connectors may comprise an actuator or a pin.

In the shaping portion of apparatus 20, the shaping members 26 are attached to the bottom transverse crossbar 24. The shaping members 26 are distributed along the length of the crossbar 24. The array of shaping members 26 defines an arc (indicated by dashed line 41) corresponding to a desired reflector curvature (e.g. a cross-sectional arc of a reflector curved along a single axis such as a curved linear Fresnel reflector or a parabolic trough reflector). In some variations, curvature in the bottom crossbar 24 may define the desired arc, so that the height of the shaping members 26 extending below the crossbar 24 is fixed. In other variations, the height of the shaping members 26 extending below the crossbar 24 may be varied so as to provide at least a portion of the curvature to form the desired arc.

For shaping a reflector having a single axis of curvature, a shaping apparatus may be equipped with one or more shaping members to allow the shaping apparatus to be translated over a surface of a mirror so as to impart the desired three-dimensional shape to the mirror without damaging the surface of the mirror. For example, a set of wheels or other rollers tracing out an arc corresponding to the desired curvature may be attached below the bottom crossbar. In other variations, a single curved roller may provide the desired arc shape. For the particular variation illustrated in FIG. 4, an array of wheels 26 is attached to and distributed along a length of the bottom crossbar 24. Wheels 26 are rolled over a mirror to shape the mirror. Bottom crossbar 24 may be shaped by connectors 25 such that the resulting height of each wheel in the array is set relative to the height of the first or last wheel 26a in the array. In some embodiments (see, e.g., FIG. 6 and related description), wheels 26 may be directly connected to top crossbar 22 such that the height of each wheel may be adjusted to define the shape imparted on the mirror, and in some of these embodiments, the bottom crossbar 24 may be absent from the shaping apparatus. In some embodiments, both the position of bottom crossbar 24 and wheels 26 relative to the top crossbar 22 may be adjusted. An exterior surface of wheels 26 can be formed from a material that does not substantially mar, scratch or otherwise damage the surface of the mirror when wheels 26 are rolled over the mirror, such as plastic, cork, rubber, felt, fabric, certain papers such as lens-grade paper or the like. In some embodiments, instead of wheels as shaping members, smooth, non-rotating slidable feet may be used. The surface of the feet that contact the mirror may comprise smooth plastic or any other suitable material (e.g. cork, rubber, felt, fabric, or lens-grade paper) that will glide easily over the surface of the mirror. It is desired that the shaping members do not compress substantially in use or compress a known amount in use, and do not unacceptably damage the surface of the mirror. An example of a suitable low friction material is Delrin™ plastic available from DuPont. In certain variations, a lubricant may be applied to wheels or feet to facilitate sliding without damaging the mirror surface. In some variations, an undersurface 37 of the bottom crossbar itself may be configured to be translated along a mirror surface without unacceptably damaging the surface of the mirror (e.g. through the use of a low friction coating or lubricant). In certain circumstances, a sacrificial protective layer (e.g. a thin polymer film) may be applied to the mirror surface prior to shaping, and then removed prior to use, e.g. in a solar field. Though 16 wheels are shown distributed along the length of the transverse crossbar in the example illustrated in FIG. 4, more or fewer wheels may be used, depending, for example, on the size of the mirror and the accuracy required in shaping the mirror. In some cases, a single shaping apparatus may employ more than one type of shaping member to facilitate movement along a surface of a mirror, e.g. a combination of one or more rollers and one or more slidable feet.

It should be noted that movement of one or more shaping members across the surface of a mirror may be accomplished in a variety of ways. For example, a shaping apparatus may be moved relative to the mirror, e.g. by translating the shaping apparatus along a length of a mirror. In some variations, a shaping portion of a shaping apparatus may be moved relative to a mirror, while one or more other components of a shaping apparatus remains static, such as a base, track, rail, slot or the like. In some variations, a mirror may be moved relative to a static shaping apparatus. In some variations, a mirror may be moved while at least a shaping portion of a shaping apparatus may be moved.

In some embodiments, the shaping apparatus includes one or more guiding members to guide movement of the shaping members along the surface of a mirror. For example, a guiding member may function to guide the position of the shaping apparatus as it translates along the length of the mirror. A guiding member may for example comprise a base, rail, track, slot or the like that is aligned with the translational direction. A guiding member may be positioned along a side of a mirror to be shaped, below a mirror, or above a mirror. A guiding member may be integral with the shaping apparatus, or may be a stand-alone device. For the variation illustrated in FIG. 4, apparatus 20 includes side-guiding members 30, positioned on one or both sides of top and bottom crossbars 22 and 24. In some variations, only one side-guiding member 30 is positioned on one side of top crossbar 22 and bottom crossbar 24. A guiding member (e.g. a side-guiding member) may align with the side of a mirror support on which the mirror is mounted, or with another frame or support formed around the mirror. In some variations, a guiding member (e.g. side-guiding members 30) may be configured to keep the top and bottom crossbars 22 and 24 perpendicular to the axis 38 along which the shaping apparatus is translated (e.g. rolled).

In some embodiments, one or more stabilizing devices may be incorporated as part of a shaping apparatus or used in conjunction with a shaping apparatus. A stabilizing device may be used to control motion of one or more shaping members as it is moved along the mirror, for example, to control side-to-side movement, front-to-back movement, or rotational movements, twist, tilt, rocking, yaw, and the like. A stabilizing device may be an integral portion of the shaping apparatus or may be a stand-alone device that is used in conjunction with the shaping apparatus. A stabilizing device may comprise one or more stabilizing arms or outriggers that extends to the front and/or side of the shaping apparatus. For the example illustrated in FIG. 4, the shaping apparatus 20 includes outrigger bar 32 connected to one or both of top and bottom crossbars 22 and 24, respectively, in a position near the center of the array of wheels 26. One or more contact members 34 (illustrated in this example as wheels) may be attached to the ends of outrigger bar 32. Contact members 34 may be positioned so that they do not contact the mirror when the shaping apparatus is properly aligned relative to a mirror to be shaped; they only contact the mirror when the shaping apparatus tips forward or backward. The contact members 34 may be configured as wheels, slidable feet, slidable pads, or the like so that when they do contact the mirror, they can roll or slide along the mirror surface without unacceptably damaging the surface.

Figure 6:
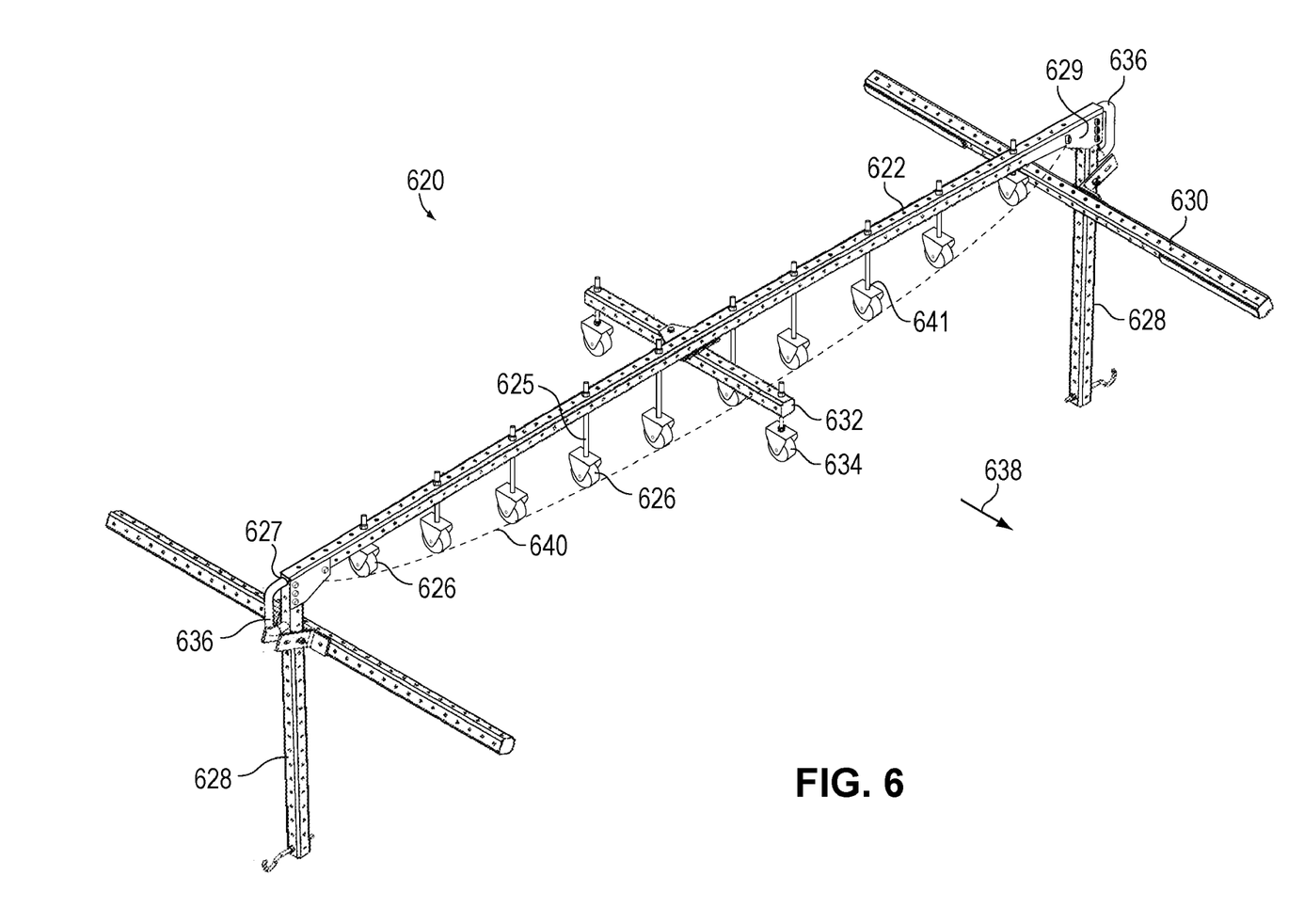
FIG. 6 illustrates a shaping apparatus according to some embodiments.

Another variation of a shaping apparatus is illustrated in FIG. 6. The shaping apparatus 620 includes a transverse (e.g. horizontal) array of shaping members 626 mounted to a frame 627. The frame 627 includes a top transverse crossbar 622. The top crossbar 622 is attached to vertical members 628, e.g. by brackets 629. In some embodiments, the top crossbar 622 may be attached to vertical members 628 such that the position of top crossbar 622 does not change relative to vertical members 628. Top crossbar 622 may be formed from any suitably rigid material such as wood, plastic, composite, ceramic, or metal such as aluminum or steel. Handles 636 may be used to move the shaping members across a mirror surface. One or more guiding members 630 may be used to guide the movement of the shaping members. For example, one or more guiding members 630 may be used to guide the translation of the shaping members along a direction 638 that is perpendicular to the transverse crossbar 622. As described above, a stabilizing device 632 comprising one or more contact members 634 (e.g. a wheel) may be used to help in positioning the shaping members over the mirror to be shaped and to help stabilize the shaping members and other portions of a shaping apparatus during movement.

In this particular variation, the shaping portion 641 of the apparatus 620 comprises multiple shaping members 626. Shaping members 626 are attached to the top crossbar 622 and extend below the top crossbar 622. The shaping members 626 are distributed along the length of the crossbar 622. The height of the shaping members 626 extending below the crossbar 622 are adjusted so that an arc 640 is traced out by ends of the shaping members 626. In some variations, a connector 625 (e.g. a rod-like connector) connects the shaping member 626 to the crossbar 622.

Like shaping members 26 in the variation illustrated in FIG. 4, the shaping member 626 can be any suitable member that can be moved (e.g. translated) along the surface of a mirror with sufficient force to shape the contour of the mirror yet not unacceptably damage the surface of the mirror. For example, the shaping member 626 can comprise a wheel, a roller, a slidable foot, a slidable pad, and the like to make contact with the mirror surface. The height of the shaping members 626 can be adjusted in any suitable manner to form the arc 640 corresponding to the desired reflector contour, e.g. by changing a height of a connector 625 between the shaping members 626 and the transverse crossbar 622, as illustrated in FIG. 6. In some variations, a curved axle about which one or more rollers rotate may be used as a shaping member to trace out arc 640. In some variations, an arcuate member with a slidable surface may be used as a shaping member to trace out arc 640.

Any suitable type of connector (e.g. adjustable length connector) may be used to connect a shaping member to a transverse crossbar. For example, the connector 625 may comprise a rod-like element that is threaded to fit into a tapped hole in crossbar 622, or passed through a clear hole in crossbar 622 and a nut may be used positioned onto a threaded end of connector 625 to adjust the height. In certain variations, one or more clamps, pins (e.g. cotter pins), or the like may be used to set the height of a shaping member relative to a transverse crossbar. In some cases, a connector 625 may be friction fit into an opening in the crossbar 622 to set a height. In some cases, a ratcheting mechanism or other mechanism that allows discrete height adjustment of a shaping member relative to a crossbar may be employed. In some variations, shaping members 626 (or connectors 625) may be selected from a set having pre-determined heights and then distributed along the length of crossbar 622 to set the arc 640.

For any of the shaping apparatus described herein, a spacing between shaping members may be selected so that the shaping apparatus provides sufficient uniformity to the contoured mirror surface, i.e. to reduce deviations from the desired mirror contour. For example, the spacing between shaping members may be selected so as to provide the requisite amount of force to provide the desired mirror contour to reduce or substantially eliminating the presence of bumps, gradations, stripes, ridges, or the like across the width and/or along the length of the mirror. In some cases, a size or density of shaping members may be selected to increase or decrease the force per unit area applied by each shaping member.

It should be noted that the spacing between shaping members need not be uniform across the length of the shaping apparatus. For example, shaping members may be more densely packed in regions where more force is required, e.g. shaping members may be positioned closer together near the center of the shaping apparatus. In some cases it may be desired to position shaping members closer together near one or both sides of a shaping apparatus.

Figure 9A:
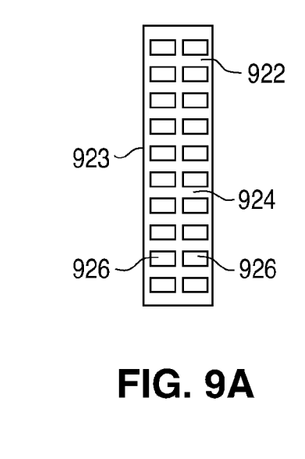
FIGS. 9A-9F illustrate various examples of arrangements of shaping members that can be used in a shaping apparatus.
Figure 9B:
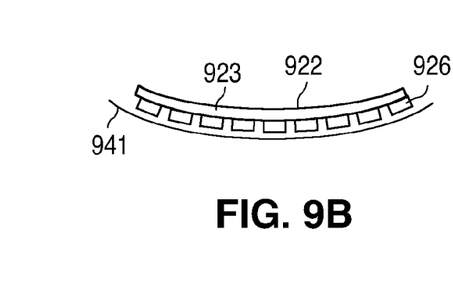
Figure 9C:
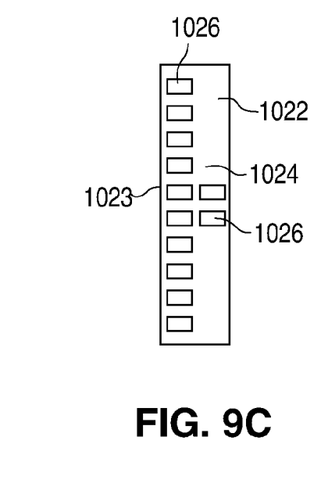
Figure 9D:
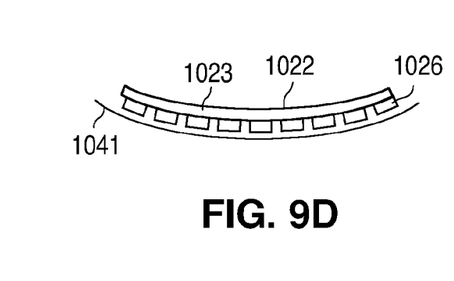
Figure 9E:
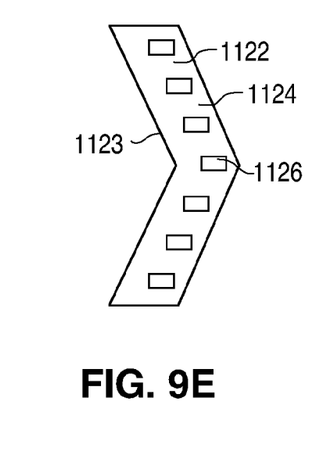
Figure 9F:
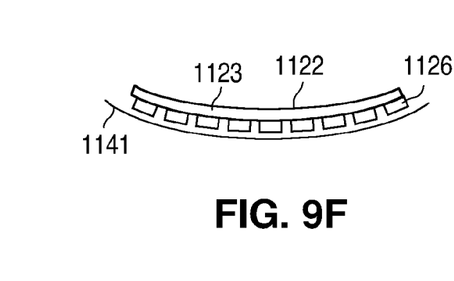

Although the shaping members illustrated in FIGS. 4 and 6 are shown to be arranged in a linear configuration along the length of a transverse crossbar, shaping members may be arranged in a nonlinear configuration across a transverse crossbar. For example, as illustrated in FIG. 9A, shaping members 926 are arranged in multiple rows along the length of the transverse crossbar 922. Multiple rows of shaping members may for example be used in situations where it is desired to reduce the pressure per unit area exerted by a single shaping member. FIG. 9A provides a plan view of the shaping members 926 as mounted to a bottom surface 924 of crossbar 922. FIG. 9B provides a side cross-sectional view along side 923 of the transverse crossbar 922 with shaping members 926 attached thereto. As shown, the shaping members 926 trace out an arc 941 corresponding to a desired reflector curvature. FIGS. 9C-9D illustrate another nonlinear arrangement of shaping members. FIG. 9C provides a plan view of the shaping members 1026 as mounted to a bottom surface 1024 of crossbar 1022. FIG. 9C provides a side cross-sectional view along side 1023 of the transverse crossbar 1022 with shaping members 1026 attached thereto. As shown, the shaping members 1026 trace out an arc 1041 corresponding to a desired reflector curvature. The shaping members 1026 are distributed in multiple rows, but the arrangement of shaping members in one row is different than in another row. For example, a second row of shaping members may preferentially populated near the center region of arc 1041. Multiple rows of shaping members may be arranged to form an arrow-like or chevron configuration with fewer (or more closely spaced together) shaping members arranged in a row that is leading translation along a length of the mirror and more (or more widely spaced apart) shaping members arranged in a following row. It should be pointed out that the transverse crossbar may be in a nonlinear configuration, e.g. a crossbar may be curved, or chevron or prow-shaped in a direction of movement. FIGS. 9E-9F provides an example of a nonlinear transverse crossbar with a nonlinear arrangement of shaping members. FIG. 9E provides a plan view of the shaping members 1126 as mounted to a bottom surface 1124 of the transverse crossbar 1122. FIG. 9F provides a side cross-sectional view along side 1123 of the transverse crossbar 1122 with shaping members 1126 attached thereto. As shown, the shaping members 1126 trace out an arc 1141 corresponding to desired reflector curvature.

Figure 7A:
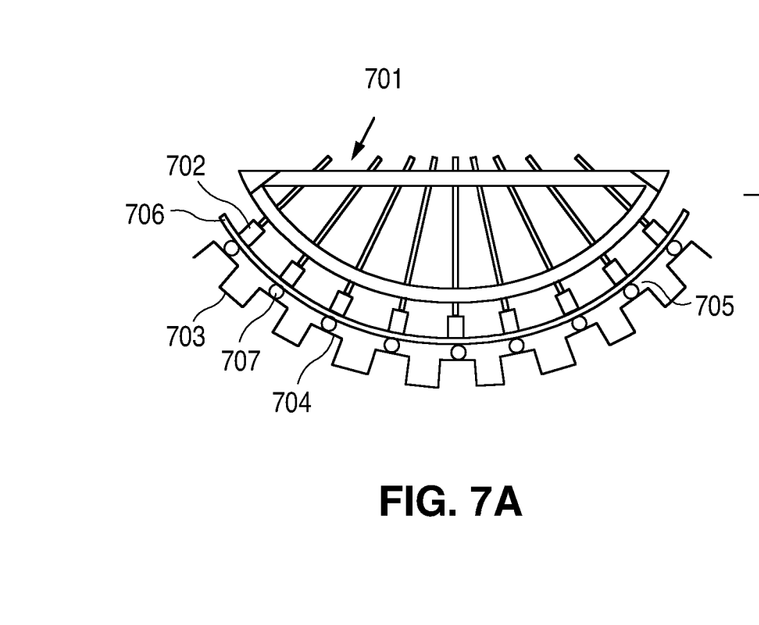
FIGS. 7A-7B illustrate an example of a process using a shaping apparatus in which a mirror is adhered to a support with a desired contour.
Figure 7B:
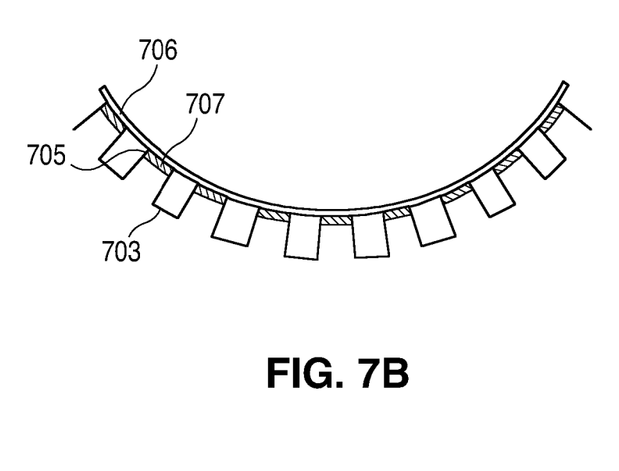

In some cases, the shaping members may be substantially aligned with regions of adhesive that have been applied along the length of the mirror, e.g. adhesive that has been applied in continuous or broken strips along the length of the mirror. In some variations, the location of the adhesive may correspond to physical supports under the mirror, e.g. ribs, struts, corrugations, and the like. Then, the downward force applied by the shaping apparatus can be locally aligned with those physical supports. For example, referring now to FIG. 7A, shaping apparatus 701 includes shaping members 702 that press down on mirror 706 while translating (e.g. rolling) along the length of the surface of the mirror (out of the plane of the paper). The mirror is supported by a corrugated support 703. A flowable, hardenable adhesive 707 is applied in continuous or broken strips along the ridges 704 of the corrugated support 703. As shown in FIG. 7B, after the shaping apparatus has been used to contour the mirror surface, the space 705 between the support 703 and the mirror 706 is compressed, leading to redistribution of the flowable uncured adhesive in the space 705 (and in some cases, being squeezed out of the space 705). The adhesive can then be cured so that the mirror 706 is adhered to the support 703 with the desired contour.

In some embodiments, a transverse crossbar of a shaping apparatus is wide enough to span a cross-sectional dimension of a reflector (e.g. short side of a mirror 10b as illustrated in FIG. 2). For a linear Fresnel reflector, a transverse crossbar may span a distance between about 1 and about 4 meters wide. Shaping members to enable translation of a shaping device (e.g. rollers, wheels or feet as described above) may be spaced apart so that any amount of striping, ridging, creasing, etc. along the width and/or length of the mirror imparted by a roller or foot is reduced. In some embodiments, shaping members to enable translation (e.g. members 26 as illustrated in FIG. 4) are spaced, for example, between about 2 and about 50, or between about 4 and about 40 cm apart.

Any suitable type of mirror may be used in conjunction with the mirror shaping apparatus and mirror shaping methods described herein. A "mirror" as used herein is meant to encompass any reflective surface, e.g. reflective-backed glass, reflective polymeric sheeting, reflective metal foils, and the like. The mirror may be sheet like and thin enough to allow shaping as described herein. In some variations, glass mirrors having a reflective backing may be used. For example, solar mirrors comprising reflective-backed low iron glass may be used, such as those manufactured by Saint-Gobain, PPG Industries, and a variety of other glass and mirror manufacturers. Mirrors that have a thickness of about 0.5 mm, about 1 mm, about 2 mm, about 3 mm, about 4 mm, or about 5 mm may be used. In some variations, a thin metallic foil mirror may be shaped as described herein.

Any suitable type of flowable and hardenable adhesive may be used to adhere a mirror to a mirror support using the apparatus and methods described herein. For example, a polyurethane adhesive, an epoxy-based adhesive, or a silicone-based adhesive may be used. "Cure" or "harden" as used herein in reference to adhesives is meant to encompass any type of drying, setting (including thermosetting), or chemical curing process that leads to fixing of the adhesive so that a mirror is rigidly attached to a mirror support. Adhesives may be cured or hardened at room temperature or at elevated temperature (e.g. with the use of a heat gun, hot airjets, or the like). In some variations, an adhesive may be a single part or a two part curable adhesive. For example, a single part moisture curable polyurethane adhesive such as Sikaflex™ 252, available from Sika Corp. (Madison Heights, Mich.) may be suitable for adhering about a 3 mm thick mirror to a mirror support. Adhesive properties such as viscosity when uncured, curing time, curing conditions, resiliency after curing, elasticity, tensile strength, shear strength, shrinkage, etc. may be selected based on the end use requirements (including mechanical and environmental requirements) for the shaped reflector, the thickness of the mirror being attached to a mirror support, the degree of curvature in the mirror, the thickness of the adhesive between the mirror and the mirror support. In some variations, adhesive may be applied in tape form.

Any of the shaping apparatus described herein may be adjusted to change the shape of the mirror being built. As described herein, either short or long focal length mirrors may be shaped by the apparatus described above, by appropriately adjusting the curvature of the arc traced out by the one or more shaping members (e.g. heights of the wheels, rollers or feet).

The mirror shaping apparatus described herein may be used to shape a mirror as follows. Referring now to FIG. 5, the mirror 40 is typically connected to a mirror support 44 by an adhesive 42. The mirror support and the cured adhesive maintain the shape of the mirror. The mirror is positioned on the mirror support and a flowable, curable adhesive is disposed between the mirror and the frame. As described above, the position of bottom crossbar (if present) and/or the position of one or more shaping members 526 (e.g. wheels) is adjusted to form an arc corresponding to the desired final shape of the mirror. Before the adhesive between the mirror and the frame cures and while the adhesive is still flowable, the shaping portion of a shaping apparatus as described herein (some examples of which are illustrated in FIGS. 4, 6, 7A, 8, or 9A-9F) is positioned over one end of the mirror and positioned against (e.g. lowered onto) the mirror such that the shaping member (or members) 526 contacts the surface of the mirror. Force (e.g. downward force) is then applied by the shaping members to the mirror, which results in compression of any space between the mirror and the mirror support, resulting in redistribution of the flowable, uncured adhesive in the space between so that the surface of the mirror follows the curvature imparted by the shaping members the shaping apparatus. While applying force, the shaping members are moved along the surface of the mirror to impart a desired three-dimensional contour to a mirror (e.g. a mirror curved along a single axis, or a spherical or parabolic mirror). Force may be applied by the shaping apparatus using any suitable method, e.g. by weight of the shaping apparatus itself, or one or more weights may be applied. For example, for the variation illustrated in FIG. 4, weights may be hung from the hooks 39 on the ends of vertical members 28. The amount of force applied may depend on the characteristics such as the stiffness or viscosity of the uncured adhesive, the curvature imparted to the mirror, and/or the rate at which the shaping members are moved across the surface. The amount of force used is sufficient to compress the adhesive enough that the mirror takes the shape defined by the shaping apparatus.

The shaping apparatus is then moved (e.g. translated by rolling or sliding) along the length of the mirror. The shaping apparatus may be translated, for example, by a person, a motor coupled to a drive, or an actuator. For example, for the apparatus illustrated in FIG. 4, translational force may be provided by pushing the handles 36 on the ends of top crossbar 22 and bottom crossbar 24. FIG. 5 illustrates a variation in which a shaping member such as a wheel 526 is rolled over a portion of a mirror connected to a mirror support 44 by an adhesive 42 (which may be applied as a continuous layer, as continuous or broken beads, or at specific locations). Any peaks, ridges, creases, bumps and the like in the mirror cross section are pushed downward by one or more shaping members until the arc-shaped profile provided by shaping members along the length of the shaping apparatus are in contact with the mirror. Deviations between the actual shape of the mirror 40 and the shape defined by the shaping apparatus are eliminated by compressing the space occupied by the uncured adhesive 42 between the mirror 40 and the frame 44, resulting in redistribution of adhesive, which may or may not include squeezing excess adhesive 42 out from between mirror 40 and frame 44. The shaping members are moved (e.g. translated by rolling or sliding) along the surface of the mirror before the adhesive between the mirror and the frame cures.

In some circumstances, the curvature of the shaping members of a shaping apparatus and the shape in the mirror support may be such that a relatively uniform thickness of cured adhesive results between the mirror and the mirror support in the shaped reflector. In some variations, there is a slight mismatch between the shape of mirror support (e.g. mismatch in curvature, surface roughness, etc.) and the curvature defined by the shaping apparatus so that a thickness of cured adhesive varies within a shaped reflector. For example, in some cases, the shape of the mirror support may be a rough approximation of the desired reflector curvature, e.g. to save engineering effort or costs required in making the mirror support. In some cases (e.g. where the desired degree of curvature is slight), a surface of the mirror support to which the mirror is adhered is essentially planar.

In some variations, the adhesive may be applied as a bead having a thickness of about 0.25 inch (about 6 mm) and applying compression with the shaping apparatus so that the thickness of the cured adhesive in the shaped reflector is about 0.125" (about 3 mm). In some variations, the thickness of the cured adhesive between the mirror support and the mirror is substantially uniform (e.g. constant to within about 0.5 mm or less). In some variations, the thickness of the cured adhesive between the mirror support and the mirror varies by about 1 mm, about 2 mm, about 3 mm, about 4 mm, or about 5 mm. For example, the thickness of the cured adhesive may vary between about 1 mm and about 4 mm, or between about 2 mm and about 4 mm, or between about 1 mm and about 5 mm, or between about 0.5 mm and about 6 mm in a shaped reflector.

Figure 8:
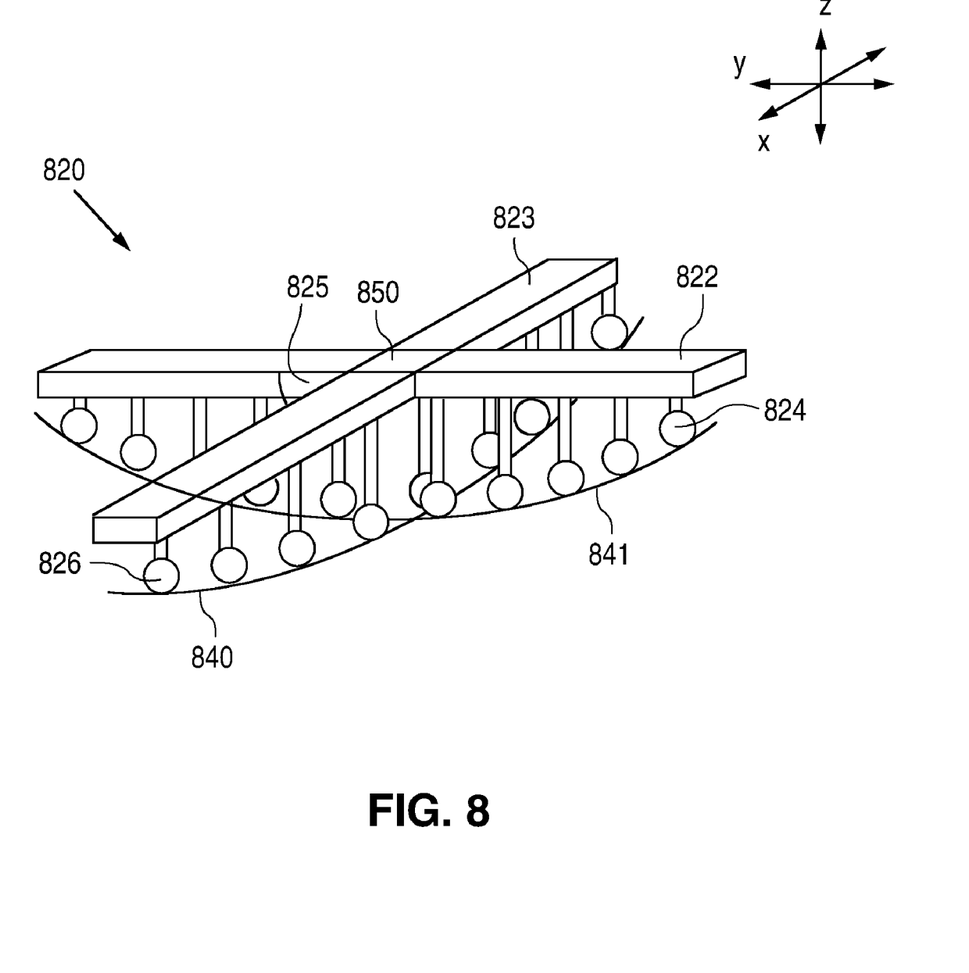
FIG. 8 illustrates another example of a shaping apparatus.

Some embodiments of shaping apparatus (e.g. those illustrated in FIGS. 4, 6, 7A-7B, and 9A-9F) may be configured for shaping a planar mirror or for shaping curvature of a mirror along one dimension to make a linear convex or linear concave mirror (e.g. for a LFR array or a parabolic trough solar array). Other embodiments of shaping apparatus may be configured for shaping curvature of a mirror along two dimensions, e.g. to make a parabolic or spherical mirror. An example of such a shaping apparatus is illustrated in FIG. 8. There, shaping apparatus 820 comprises a first transverse crossbar 822 and a second transverse crossbar 823 that may or may not be oriented orthogonal to the first transverse crossbar. Attached to each of the transverse crossbars is an arrangement of shaping members, where the shaping members are distributed along the length of the crossbar and extend from the crossbar with varying heights relative to the crossbar so that the ends of the shaping members map out a contour. Referring again to FIG. 8, shaping members 824 are attached to first crossbar 822 and extend at varying heights from crossbar 822 so that the ends of shaping members 824 map out contour 840. Shaping members 826 are attached to second crossbar 823 and extend at varying heights from crossbar 823 so that the ends of shaping members 824 map out contour 841. An angle 825 between the two crossbars 822 and 823 may be fixed or variable, e.g. junction 850 may comprise a fixed joint such as a fixed right angle joint in the x-y plane (as indicated in the inset to FIG. 8) or a rotatable joint such as a rotatable joint that may be locked at a desired position. If junction 850 comprises a rotatable joint, it may be configured to allow the cross-bars 822 and 823 to rotate relative to each other in the x-y plane, or in the y-z plane, or in both the x-y and y-z planes.

To shape a reflector, the apparatus 820 as illustrated in FIG. 8 can be adjusted so that at least some of the shaping members 824 and 826 contact the surface of a mirror that is laid over a support that has a predetermined curvature (e.g. as shown in FIG. 5). Force can be applied to the mirror by the shaping members of the shaping apparatus to force the mirror against the support, and then the shaping members can be moved along the surface of the mirror while still applying force to the mirror to impart the predetermined curvature of the support to the mirror. Apparatus 820 can be rotated or twisted, e.g. about the z-axis, with the center of rotation aligned with joint 850, to cause shaping members to move along the surface of the mirror while still applying force. For example, force can be applied to the mirror that results in compression of a space between the mirror and the support and redistribution of a flowable adhesive disposed in the space. Once the surface of the mirror has been shaped to reduce or remove bumps, ridges, and any other deviations from the desired contour, the adhesive can be hardened (e.g. cured or set) so that the reflector so shaped maintains the desired contoured reflective surface.

Variants of shaping apparatus in addition to that illustrated in FIG. 8 are envisioned that comprise more than two transverse crossbars, with multiple shaping members extending from each transverse crossbar over a distribution of heights relative to the crossbar to map out a contour along the length of that crossbar. For example, a shaping member may comprise three or four (or even more) transverse crossmembers, each having variable height shaping members extending therefrom to map out a contour along the length of each crossbar. The multiple transverse crossbars may be coupled together at a centrally located junction (similar to junction 850 in FIG. 8) that may be fixed or rotatable.

A shaping apparatus comprising two or more transverse crossbars each having multiple shaping members extending therefrom (e.g. apparatus 820 illustrated in FIG. 8) may also include a support structure to allow positioning of the apparatus relative to a mirror overlaid over a contoured frame, a stabilizing member to control tilt, rocking, and other undesired motions, fixtures to allow hanging of weights to increase downward force applied by the shaping apparatus, handles to allow manual positioning of the apparatus, one or more motors or drives to allow automatic positioning of movement of the apparatus. Further, any suitable shaping members may be used with shaping apparatus such as that illustrated in FIG. 8. For example, wheels, rollers, pads, slidable feet, slidable surfaces, or a combination thereof may be used in various embodiments. More than one type of shaping member may be attached to a single transverse crossbar in some variations. For example, one type of shaping member such as a roller may be used near the center of the crossbar to correspond with a low point in the contour and another type of shaping member such as a slidable pad may be used near the outer edges of the crossbar. In some variations, one type of shaping member may be used for attaching to one transverse crossbar, and another type of shaping member may be used for attaching to another transverse crossbar.

Any of the shaping apparatus or reflector shaping methods described herein can be used to shape planar, linear convex, linear concave, spherical concave, spherical convex, parabolic concave or parabolic convex reflectors.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is being claimed is:

1. A method of shaping a reflector using a shaping apparatus comprising a crossbar and an array of shaping members attached to a bottom of the crossbar so as to form a predetermined shape, the method comprising:
    positioning the shaping apparatus over a mirror such that at least a portion of the shaping members contact a surface of the mirror;
    moving the shaping members along the surface of the mirror such that the shaping members apply force to impart the predetermined shape to the mirror; and attaching a mirror support to the mirror such that when the shaping apparatus is removed from the mirror, the mirror retains the predetermined shape;

wherein:

the crossbar is attached to a stabilizing member that controls motion of the shaping apparatus during movement of the shaping members along the surface of the mirror;

the stabilizing member comprises an outrigger bar disposed in a middle section of the crossbar and positioned perpendicular to the crossbar;

at least one outrigger wheel is positioned proximate an end of the outrigger bar; and positioning the shaping apparatus comprises positioning the crossbar such that the outrigger wheel does not contact the mirror.

2. The method of claim 1 wherein at least one of the shaping members comprises a wheel.

3. The method of claim 1 wherein the crossbar is a bottom crossbar, and the shaping apparatus further comprises:

a top crossbar; and at least one connector connecting the top crossbar to the bottom crossbar.

4. The method of claim 3 wherein the connector is configured such that a distance between the top crossbar and the bottom crossbar may be changed by adjusting the connector.

5. The method of claim 1 comprising connecting one or more weights to the crossbar to increase force applied by the shaping members.

6. The method of claim 1 wherein the crossbar is attached to side-guiding members disposed on each end of the crossbar and positioned perpendicular to the crossbar, the method further comprising:

aligning the side-guiding members with the mirror support to maintain the crossbar perpendicular to an axis along which the shaping members are moved.

7. The method of claim 1 wherein moving the shaping members along the surface of the mirror compresses a space containing a flowable and hardenable adhesive between the mirror support and the mirror such that adhesive is redistributed and the members impart the predetermined shape to the mirror, and attaching the mirror support to the mirror to retain the shape comprises hardening the adhesive.

8. The method of claim 1 wherein moving the shaping members along the surface of the mirror comprises translating the shaping members along a length of the mirror.

9. A method of shaping a reflector, the method comprising:

placing a mirror on a mirror support, wherein a flowable and hardenable adhesive is disposed in a space between the mirror and the mirror support;

using a shaping apparatus comprising an outrigger bar and one or more shaping members to apply force against a surface of the mirror to compress the space between the mirror and the mirror support; the one or more shaping members forms an arc corresponding to a desired contour; and moving the one or more shaping members in the form of the arc along the surface of the mirror while applying force to the mirror surface so as to redistribute the adhesive in the space to impart the desired contour to the mirror, wherein during moving, the shaping apparatus is positioned such that the outrigger bar does not contact the mirror; and hardening the adhesive so that the mirror is adhered to the mirror support so as to maintain the desired contour.

10. The method of claim 9, comprising translating the one or shaping members along a length of the mirror while applying force against the surface of the mirror.

11. The method of claim 9, comprising rotating the one or more shaping members while applying force against the surface of the mirror.

12. The method of claim 9, wherein multiple shaping members are arranged to form the arc.

13. The method of claim 9, wherein the one or more shaping members comprises a roller configured to be rolled across the surface of the mirror.

14. The method of claim 9, adapted for shaping a reflector for use in a solar collector.

15. The method of claim 14, adapted for shaping a reflector for use in a linear Fresnel reflector solar array.

16. The method of claim 14, adapted for shaping a reflector in a parabolic trough solar array.

* * * * *